United States Patent
Akiyama et al.

(10) Patent No.: US 6,987,757 B1
(45) Date of Patent: Jan. 17, 2006

(54) CALL SETTING METHOD FOR NETWORK SYSTEM

(75) Inventors: Masanori Akiyama, Kawasaki (JP); Kazuyuki Ohtsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 639 days.

(21) Appl. No.: 09/723,407

(22) Filed: Nov. 28, 2000

(30) Foreign Application Priority Data

Feb. 14, 2000 (JP) ............................. 2000-035018

(51) Int. Cl.
  *H04L 12/66* (2006.01)

(52) U.S. Cl. ...................................... 370/353; 370/466

(58) Field of Classification Search ................ 370/352, 370/353, 354, 401, 410, 466
See application file for complete search history.

(56) References Cited

U.S. PATENT DOCUMENTS

| | | | | |
|---|---|---|---|---|
| 4,740,954 A | * | 4/1988 | Cotton et al. ................ | 370/408 |
| 5,634,011 A | * | 5/1997 | Auerbach et al. ............ | 709/242 |
| 6,157,636 A | * | 12/2000 | Voit et al. .................... | 370/353 |
| 6,331,983 B1 | * | 12/2001 | Haggerty et al. ............ | 370/400 |
| 6,426,955 B1 | * | 7/2002 | Gossett Dalton et al. ... | 370/401 |
| 6,584,110 B1 | * | 6/2003 | Mizuta et al. ............... | 370/401 |

FOREIGN PATENT DOCUMENTS

| | | | |
|---|---|---|---|
| EP | 902569 A1 | * | 3/1999 |
| JP | 10-164144 | | 6/1998 |
| WO | WO 9929137 A2 | * | 6/1999 |

OTHER PUBLICATIONS

Rizzetto, D. et al. "A Voice Over IP Service Architecture for Integrated Communications". Internet Computing, IEEE. May-Jun. 1999. vol. 3. iss. 3. pp. 53-62.*
Thomsen, G. et al. "Internet Telephony Going Like Crazy". Spectrum, IEEE. May 2000. vol. 37. iss. 5. pp. 52-58.*

* cited by examiner

*Primary Examiner*—John Pezzlo
*Assistant Examiner*—Donald L Mills
(74) *Attorney, Agent, or Firm*—Katten Muchin Rosenman LLP

(57) ABSTRACT

When a call is set between a first line switching network of a call-out side and a second line switching network of a call-in side, a first gateway, if receives a call setting message from the first line switching network, transmits a inquiry message to at least one of second gateway. Each of second gateway from which received the inquiry message transmits a response message to the first gateway when a second gateway itself can communicate a call setting message to the second line switching network. Thereafter, the first gateway selects a second gateway for transmitting the call setting message within the second gateways to which transmitted the response message, and transmits the call setting message to the selected second gateway.

12 Claims, 12 Drawing Sheets

CONVERSION TABLE 34

| DIALLING NUMBER | IP ADDRESS (MULTICAST ADDRESS) | GATEWAY TYPE |
|---|---|---|
| 711 | XXX.XXX.XXX.110 | MAIN GATEWAY |
| 722 | XXX.XXX.XXX.220 | MAIN GATEWAY |
| 722 | XXX.XXX.XXX.330 | SPARE GATEWAY |
| 733 | XXX.XXX.XXX.330 | MAIN GATEWAY |
| 733 | XXX.XXX.XXX.220 | SPARE GATEWAY |

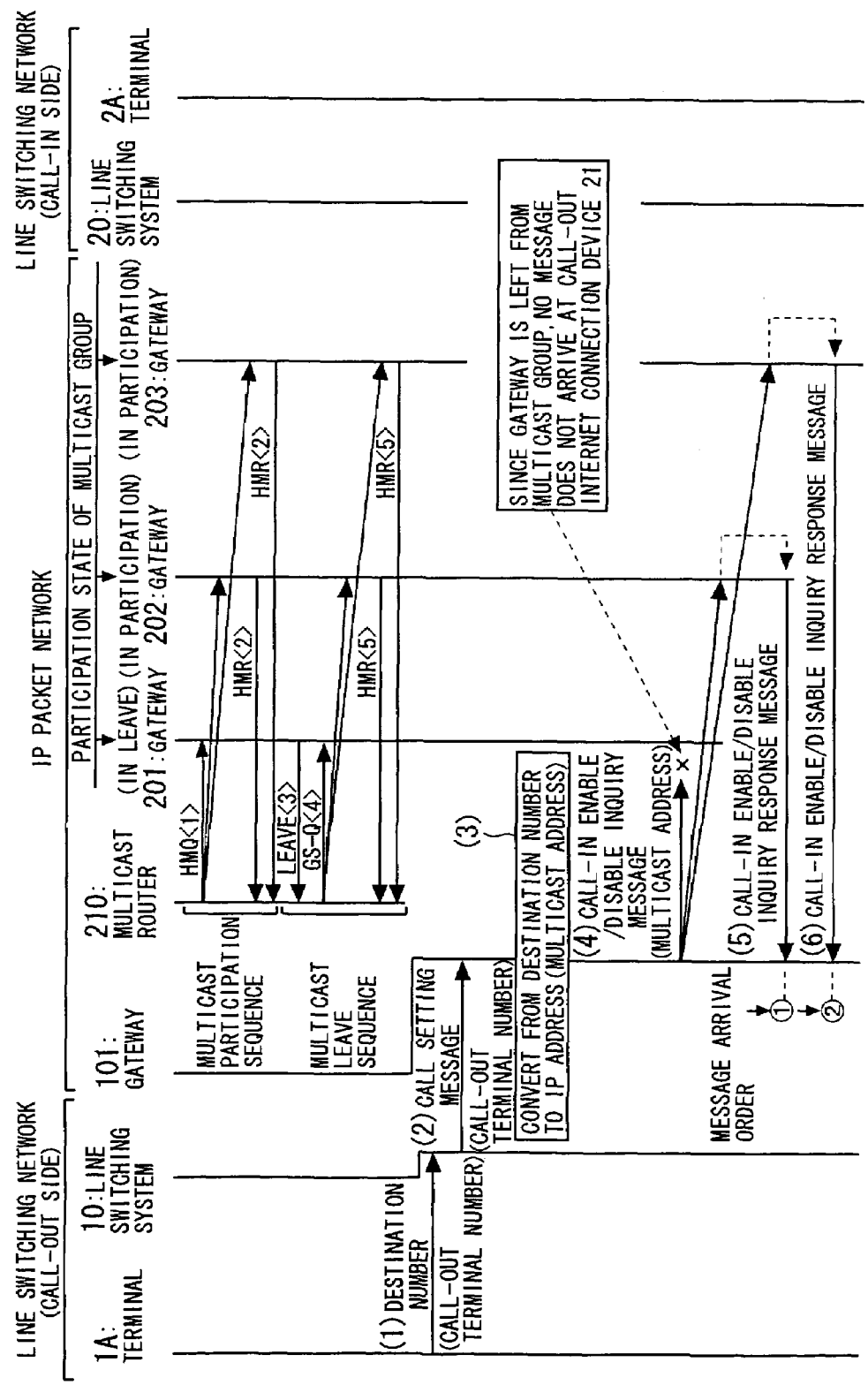

FIG. 9A

| CALL-IN INQUIRY (QUERY) |
|---|
| INFORMATION SIZE LENGTH |
| GATEWAY TYPE<br>0: MAIN GATEWAY<br>1: SPARE GATEWAY |

FIG. 9B

| CALL-IN INQUIRY RESPONSE (QUERY CONNECT) |
|---|
| INFORMATION SIZE LENGTH |
| GATEWAY TYPE<br>0: MAIN GATEWAY<br>1: SPARE GATEWAY |

CALL SETTING METHOD FOR NETWORK SYSTEM

BACKGROUND OF THE INVENTION

1. Field of the Invention

The present invention relates to a call setting method for a network system in which a plurality of circuit switching networks is connected to an IP packet network.

2. Description of the Prior Art

With the progress of recent network technology, integration between an audio network and a data network is rapidly developed. As one integrated network, a voice over IP (VoIP) network for realizing voice communication through an IP packet network (e.g., the internet or an intranet) is known. The VoIP network is constituted by, for example, an IP packet network, a plurality of line switching networks (e.g., a telephone network), and a plurality of connection devices (e.g., gateway devices) for connecting the IP packet network and the line switching network to each other. Each line switching network has a line switching system accommodating a single terminal device or a plurality of terminal devices. The line switching system is connected to the IP packet network through a single gateway device or a plurality of gateway devices.

In a conventional technology, when a call which passes through an IP packet network is set between line switching networks, the following operation shown in FIG. 13 is performed. In the example shown in FIG. 13, a line switching network on a call-out side has a line switching system 1b which accommodates a terminal 1a. The line switching system 1b is connected to the IP packet network through a gateway device 11. On the other hand, a line switching network on a call-in side has a line switching system 2b which accommodates a terminal 2a. The line switching system 2b is connected to the IP packet network through gateway devices 21, 22, and 23.

In FIG. 13, it is assumed that the terminal 1a serves as a call-out terminal and that the terminal 2a serves as a call-in terminal. In this case, a call is set between the terminal 1a and the terminal 2a, the terminal 1a perform a call-out operation to input the dial number (destination number) of the terminal 2a to the line switching system 1b as a call-in terminal number. At this time, the line switching system 1b transmits a call setting message including the call-in terminal number to the gateway device 21.

When the gateway device 11 receives the call setting message, the gateway device 11 calculates the IP address of a destination from the call-in terminal number included in the call setting message and transmits an IP packet including the call setting message to the calculated IP address. In this example, as an IP address corresponding to the destination number, the IP address of the gateway device 21 is set. For this reason, the transmitted IP packet is transmitted to the gateway device 21 corresponding to the destination through the IP packet network.

When the gateway device 21 receives the IP packet, the gateway device 21 tries to transmit the call setting message to the line switching system 2b. Here, when all the lines for connecting the gateway device 21 and the line switching system 2b are busy, and when obstacles are generated by the lines, the gateway device 21 gives a connection disable notification (release completion message in FIG. 13) that the gateway device 21 cannot make the line switching system on the call-in side to receive the call setting message the gateway device (gateway device 11) on the call-out side through the IP packet network.

When the gateway device 11 receives the connection disable notification until a predetermined period of time has passed after the gateway device 11 receives the IP packet, the gateway device 11 calculates the IP address of another gateway device (gateway device 22 or 23) connected to the circuit switching system 2b, and transmits an IP packet including the call setting message to the IP address. In the example shown in FIG. 13, the IP packet is transmitted to the gateway device 22.

However, when the gateway device 22 cannot transmits the call setting message to the line switching system 2b, as in the above description, the connection disable notification is given to the gateway device 11. When the gateway device 11 receives the connection disable notification within a predetermined period of time, the gateway device 11 calculates the IP address of another gateway device (gateway device 23) again to transmit an IP packet including the call setting message to the gateway device 23.

When it is determined that the gateway device 23 can transmit the call setting message to the line switching system 2b, the gateway device 23 extracts the call setting message from the IP packet and transmits the call setting message to the line switching system 2b on the basis of the call-in terminal number included in the call setting message. When the line switching system 2b receives the call setting message, the line switching system 2b calls the terminal 2a. Thereafter, several procedures are performed, a call is set between the terminal 1a and the terminal 2a.

When the gateway devices 21, 22, and 23 can transmit the call setting messages received from the gateway devices on the call-out side to the line switching system on the call-in side, the gateway devices 21, 22, and 23 do not transmit the notifications that the call setting messages can be transmitted to the gateway devices on the call-out side. The gateway devices on the call-out side transmit IP packets and then receive connection disable notifications within a predetermined period of time, the gateway devices recognize that the call setting messages are transmitted from the gateway devices on the call-in side to the line switching system on the call-in side, and does not perform the process of calculating the IP address of another call-in side gateway devices.

In the conventional technology, the gateway device on the call-out side must transmit IP packet including call setting message to a gateway device having an IP address corresponding to a call-in terminal number, first. In this manner, in the conventional technology, a gateway device on the call-out side, when there are a plurality of gateway devices which can become a gateway device on the call-in side, cannot transmit the IP packet including the call setting message to an optimum gateway device selected from the plurality of gateway devices.

When the gateway device on the call-out side wait for response from the gateway device corresponding to a destination of the IP packet and receive connection disable notification from the destination gateway device, the gateway device retransmit the IP packet including the call setting message to another gateway device. Such a retransmitting process is repeated every gateway device until a gateway device which can transmit the call setting message to the line switching system on the call-in side is found or until there is no gateway device to which the IP packet must be transmitted.

Therefore, when the gateway device on the call-in side cannot transmit a call setting message to the line switching system on the call-in side, the gateway devices on the call-out side repeatedly transmit the same IP packets to another gateway device. For this reason, a load acting on the IP packet network increases, and messages and data transmitted through the IP packet network may be delayed.

SUMMARY OF THE INVENTION

It is an object of the present invention to provide a call setting method for a network system which can reduce a load acting on an IP packet network by preventing a call setting message from a line switching network on a call-out side from being repeatedly retransmitted.

The present invention has the following configuration to achieve the above object. That is, the present invention is a call setting method for a network system comprising a first line switching network as a line switching network on a call-out side, a first gateway connected with said first line switching network, an IP packet network connected with said first gateway, a plurality of second gateways respectively connected with said IP packet network, and a second line switching network as a line switching network on a call-in side connected with each of said second gateways, wherein said first gateway, when a call is set between said first line switching network and said second line switching network through said IP packet network, receives a call setting message from said first line switching network;

said first gateway transmits a call-in enable/disable inquiry message to the IP packet network to specify a second gateway which can transmit the call setting message to the second line switching network;

the call-in enable/disable inquiry message is received by at least one of said second gateways through said IP packet network;

said second gateway from which received the call-in enable/disable inquiry message, if said second gateway itself can communicate a call setting message to said second line switching network, transmits a call-in enable/disable inquiry response message to said first gateway; and said first gateway selects a second gateway for transmitting the call setting message within at least one of said second gateways to which transmitted the call-in enable/disable inquiry response message and transmits the call setting message to said selected second gateway.

BRIEF DESCRIPTION OF THE DRAWINGS

FIG. 6 is a diagram for explaining a first operation in the network system shown in FIG. 1.

FIGS. 9A and 9B are tables for explaining formats of a call-in enable/disable inquiry message and call-in enable/disable inquiry response message.

DESCRIPTION OF THE PREFERRED EMBODIMENTS

Embodiments of the present invention will be described below with reference to the accompanying drawings.

First Embodiment

<Configuration of VoIP Network System>

Figure 1:
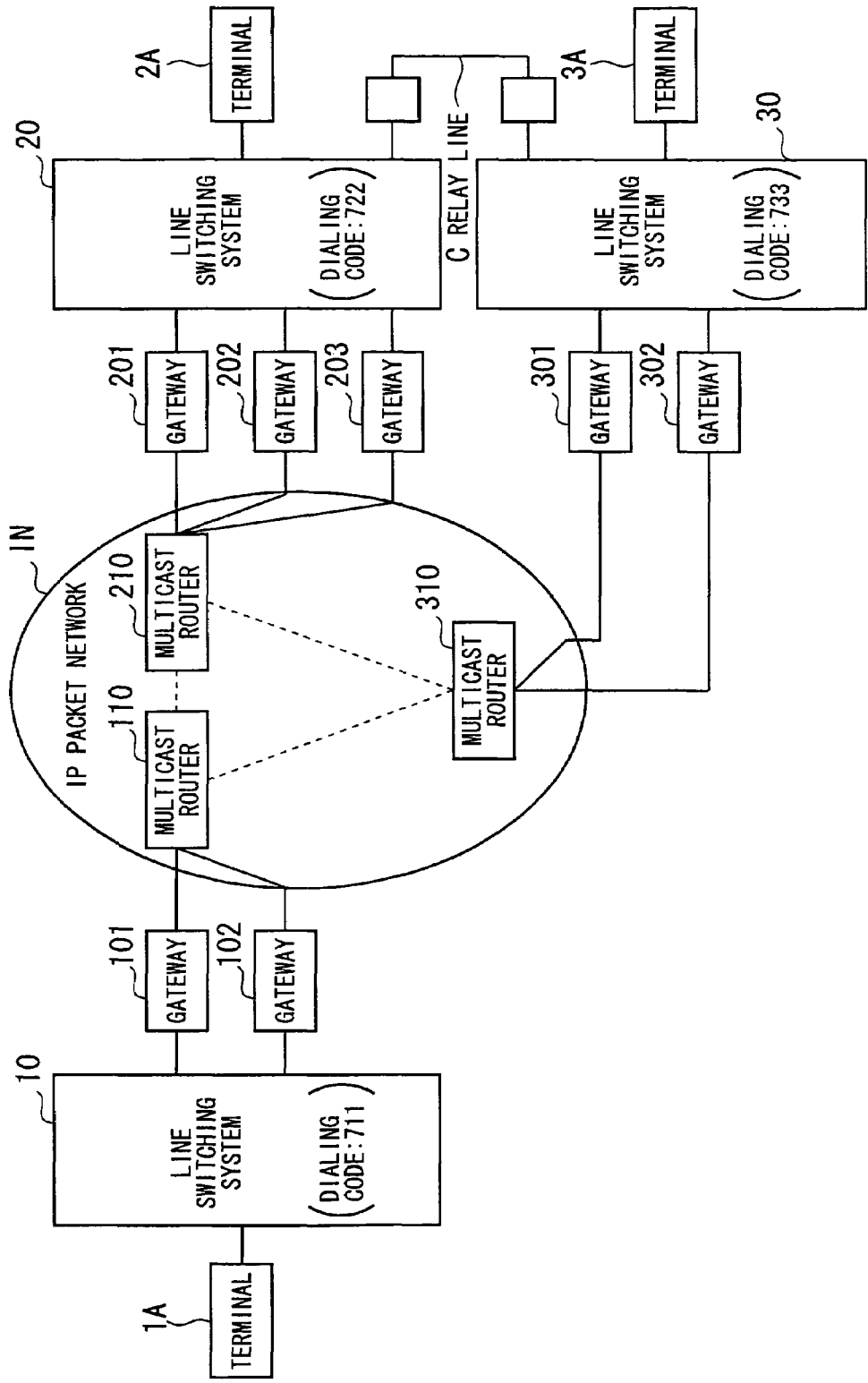
FIG. 1 is a diagram showing a network system according to an embodiment of the present invention.

FIG. 1 is a diagram showing a VoIP network system (to be referred to as a "VoIP system" hereinafter) according to the embodiment of the present invention. In FIG. 1, in the VoIP system, a first line switching network, a second line switching network, and a third line switching network are connected to an IP packet network IN.

More specifically, the first line switching network comprises a line switching system 10 which accommodates a terminal 1a therein, and the line switching system 10 is connected to the IP packet network IN through gateway devices 101 and 102. The second line switching network comprises a line switching system 20 which accommodates a terminal 2a therein, and the line switching system 20 is connected to the IP packet network IN through gateway devices 201, 202, and 203.

The third line switching network comprises a line switching system 30 which accommodates a terminal device 3A, and the line switching system 30 is connected to the IP packet network IN through gateway devices 301 and 302. The line switching system 20 and the line switching system 30 are connected to each other through a relay line C (e.g., an ISDN line), and the second line switching network and the third line switching network are connected to each other.

The terminal devices 1A, 2A, and 3A are personal computers (PC), workstations (WS), mobile computers, and the like. The line switching networks 10, 20, and 30 are, for example, Private Branch Exchanges (PBXs). The IP packet network IN, for example, the internet or an intranet, and comprises a plurality of routers and the like. In FIG. 1, a router 110 connected to the gateway devices 101 and 102, a router 210 connected to the gateway devices 201, 202, and 203, and a router 310 connected to the gateway devices 301 and 302 are shown.

The router 110 is a source node for the gateway devices 101 and 102, the router 210 is a source node for the gateway devices 201, 202, and 203, and the router 310 is a source node for the gateway devices 301 and 302. The routers 110, 210, and 310 are connected to each other through the node of another router or the like in the IP packet network IN.

The gateway device 101 corresponds to the first gateway of the present invention. The gateway devices 201, 202, and 203 correspond to the plurality of second gateways of the present invention. The gateway devices 301 and 302 correspond to the third gateways of the present invention.

<Configuration of Gateway Device>

The configuration of a gateway device in the VoIP system according to the embodiment will be described above. The gateway devices illustrated in FIG. 1 have the same configurations. For this reason, the gateway device 101 will be described below as an example.

Figures 2, 3:
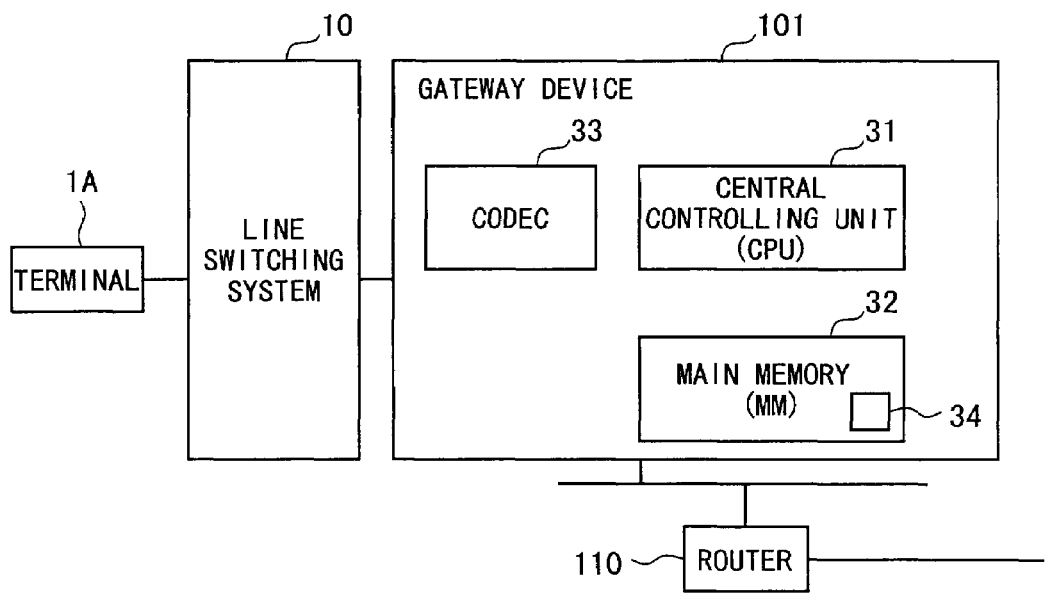
FIG. 2 is a diagram showing a gateway device shown in FIG. 1.
FIG. 3 is a table for explaining a conversion table shown in FIG. 2.

FIG. 2 is a diagram showing the gateway device. In FIG. 2, the gateway device 101 comprises a central controlling unit 31, a main memory (MM) 32, and a encoder/decoder (CODEC) 33.

The central controlling unit 31 is constituted by a CPU (Central Processing Unit), a memory unit on which various programs are recorded, a communication control unit, and the like. The CPU executes the various programs to execute call control, data transmission control, and the like. The central controlling unit 31 functions as a reading unit, an editing unit, a transmitting unit, a message receiving unit and a receiving unit of the present invention.

The MM 32 is used as a work area of the central controlling unit 31. The MM 32 holds a dialing code—IP address—gateway conversion table (to be referred to as a "conversion table" hereinafter) 34. The conversion table corresponds to a table according to the present invention.

FIG. 3 is a table for explaining the conversion table 34. As shown in FIG. 3, the conversion table 34 holds a plurality of records constituted by items, i.e., a "dialing code", an "IP address (multicast address)", and a "gateway type".

The CODEC 33 generates packet data stored in a packet data by coding data received from the line switching network. On the other hand, the CODEC 33 generates data obtained by decoding and expanding the packet data included in the IP packet received from the IP packet network IN.

<Function of Multicast Router>

Figure 4:
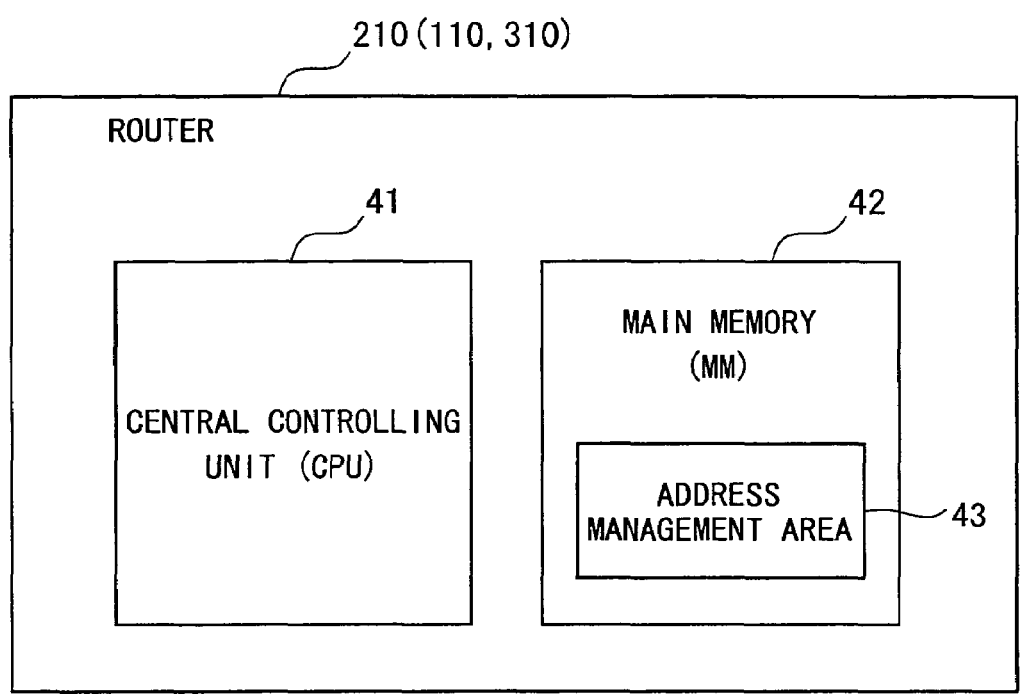
FIG. 4 is a diagram showing a multicast router shown in FIG. 1.

The function of each of the routers 110, 210, and 310 set as a multicast router will be described below. FIG. 4 is a diagram showing the configuration of each of the routers 110, 210, and 310. Since the routers 110, 210, and 310 have the same configurations, the router 210 will be described below as an example.

The router 210 comprises a central controlling unit 41 and a main memory 42. The central controlling unit 41 is constituted by a CPU, a memory unit (ROM, RAM, or the like), a communication control unit, and the like. Various control programs stored in the memory unit are executed to execute control related to transmission of an IP packet.

For example, when the central controlling unit 41 receives an IP packet, the central controlling unit 41 transmits refers to the destination IP address of the packet to transmit the IP packet from a transmission port corresponding to the destination. At this time, when the destination IP address of the IP packet is a multicast address, the central controlling unit 41 respectively transmits the IP packets from transmission ports corresponding to a single destination or a plurality of destinations which participates in a predetermined multicast group.

In this embodiment, the gateway devices 201, 202, and 203 directly connected to the router 210 are set as gateway devices which can participate in a multicast group corresponding to the router 210.

The main memory 42 is used as a work area for a program executed by the central controlling unit 41. The main memory 42 holds an address management area 43 for causing the central controlling unit 41 to manage a participation/leave state for the multicast group of the gateway devices 201, 202, and 203. In the address management area 43, the IP address of a gateway device which participates in the multicast group is stored.

Figure 5A:
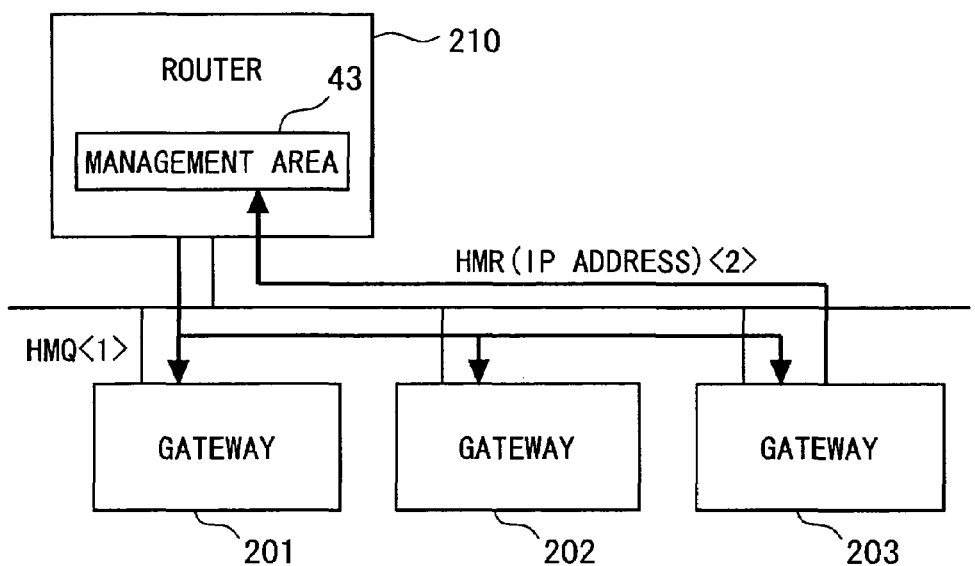
FIGS. 5A and 5b is a diagram for explaining a participation/leave procedure for a multicast group.
Figure 5B:
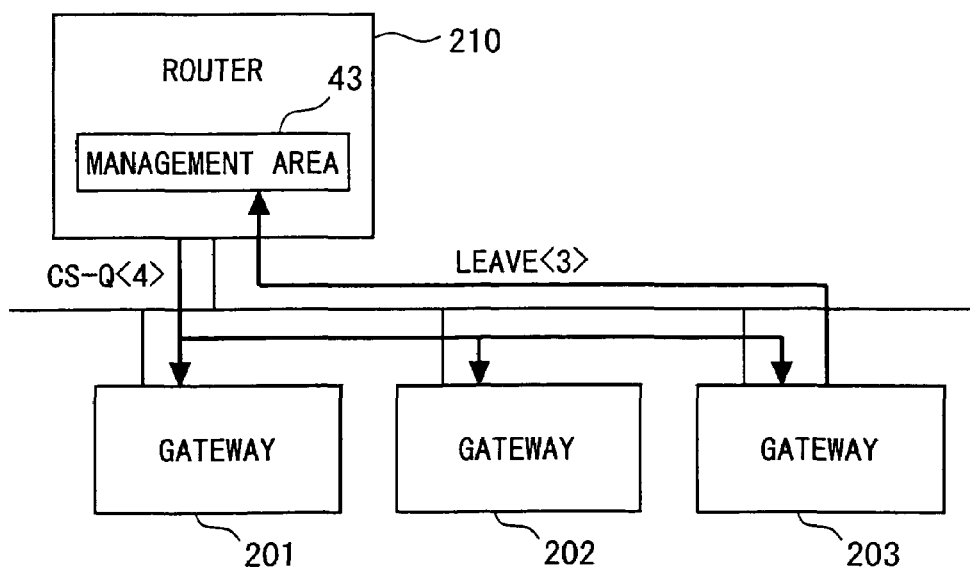

The management of the multicast group by the central controlling unit 41 of the router 210 will be described below. FIG. 5A is a diagram for explaining a participating procedure for the multicast group of the gateway device, and FIG. 5B is a diagram for explaining a leave procedure for the multicast group of the gateway device.

As shown in FIG. 5A, the router 210 periodically transmits a message (HMQ message) for inquiring about participation in the multicast group to an IP address "224. 0. 0. 1 (ALL SYSTEMS-GROUP)" serving as a group address. In this manner, the HMQ message is multicast to each of the gateway devices 201, 202, and 203 which can participate in the multicast group <1>.

Each of the gateway devices 201, 202, and 203 (of the central controlling unit 31) receives HMQ message. Then, each of the gateway devices 201, 202, and 203 operates the same processing. Therefore, the processing of the gateway device 203 will be described below as an example.

The gateway device 203 decides whether the gateway device 203 can participate in the multicast group or not. At this time, the gateway device 203, when determines that the gateway devices 203 can not participate in the multicast group, ignores the HMQ message.

For example, the gateway device 203 determine that the gateway device 203 do not participate in the multicast group when data or messages cannot be transmitted to the line switching system 20, e.g., when all the lines connected to the line switching system 20 are busy or when a line malfunction occurs.

On the other hand, the gateway device 203, when can participate in the multicast group, transmits the response messages (HMR messages) of the HMQ messages including the IP address of the gateway device 201 to the router 210 <2>. FIG. 5A illustrates a case in which only the gateway device 203 participates in the multicast group and each of the gateway devices 201 and 202 ignores the HMQ message.

When the central controlling unit 41 of the router 210 transmits the HMQ message, the central controlling unit 41 starts the clocking of an HMR message reception timer, and the central controlling unit 41 waits the HMR messages are transmitted from each of the gateway devices 201, 202, and 203.

Thereafter, the central controlling unit 41, when receives the HMR message at least one of the gateway devices 201, 202, and 203 before the timer is set in a time-out state, stores the IP address of the gateway device included in the HMR message in the address management area 43.

Thereafter, the central controlling unit 41, when receives an IP packet in which a multicast is designated, multicasts the IP packet to the IP address (for example, gateway device 203) stored in the address management area 43. In this manner, a multicast packet is multicast to each of the gateway devices which participated in the multicast group.

As shown in FIG. 5B, when the gateway device 203 which participates in the multicast group is left from the multicast group, the gateway device 203 transmits a LEAVE message representing that the gateway device 203 leaves from the multicast group to an IP address "224. 0. 0. 2 (ALL ROUTERS-GROUP)". In this manner, the LEAVE message is received by the router 210 <3>.

When the central controlling unit 41 of the router 210 receives the LEAVE message, the central controlling unit 41 erases all IP addresses stored in the address management area 43. In this manner, all gateway devices including the gateway device 203 leaves from the multicast group.

Thereafter, the central controlling unit 41 multicasts a message (GS-Q message) for checking that no gateway which participates in the multicast group exists to a group address "224. 0. 0. 1". In this manner, the GS-Q message is transmitted to the gateway devices 201, 202, and 203 <4>.

When the central controlling unit 31 of each of the gateway devices 201, 202, and 203 receives the GS-Q message, if the central controlling unit 31 desires a participation to the multicast group, the central controlling unit 31 transmits the HMR message to the router 210 <5: see FIG. 6>.

On the other hand, when the central controlling unit 31 receives the GS-Q message, if the central controlling unit 31 do not desire the participation to the multicast group, the central controlling unit 31 ignores the SG-Q message.

When the central controlling unit 41 of the router 210 receives the HMR message corresponding to the GS-Q message before the reception waiting timer is set in a time-out state, the central controlling unit 41 stores the IP address included in the HMR message in the address management table 43. In this manner, the participation state of the gateway device which participates in the multicast group before the router 210 receives the LEAVE message is maintained.

<Operation of Call Setting State>

An operation (embodiment of a call setting method) in a call setting state in the VoIP system described above will be described below. For the sake of descriptive convenience, the following conditions are supposed in the configuration of the VoIP system shown in FIG. 1.

(1) The dialing code of the line switching system 10 is "711", the dialing code of the line switching system 20 is "722", and the dialing code of the line switching system 30 is "733". The terminal number of the terminal device 1A is "100", the terminal number of the terminal device 2A is "200", and the terminal number of the terminal device 3A is "300".

(2) When a call is connected from the terminal device 1A to the terminal device 2A, a destination number (terminal number of call-in terminal)=722-200 is dialed in the terminal device 1. At this time, the call is connected to the IP packet network IN through the gateway device 101 or the gateway device 102. Thereafter, the call is connected to the terminal device 2A of the line switching system 20 through any one of the gateway device 201, the gateway device 202, and the gateway device 203.

(3) When a call is connected from the terminal device 1A to the terminal device 3A, destination number=733-300 is dialed in the terminal device 1A (connection to the destination is established by dialing code+terminal number).

(4) The line switching system 30 and the line switching system 20 are connected to each other by a relay line C, the terminal device 3A and the terminal device 2A can be connected to each other without the IP packet network IN. (When a call is connected from the terminal device 3A to the terminal device 2A, destination number=722-200 is dialed. However, a relay line is used only when the terminal device 3A and the terminal device 2A cannot be connected to each other through the IP packet network).

(First Operation)

Figure 7:
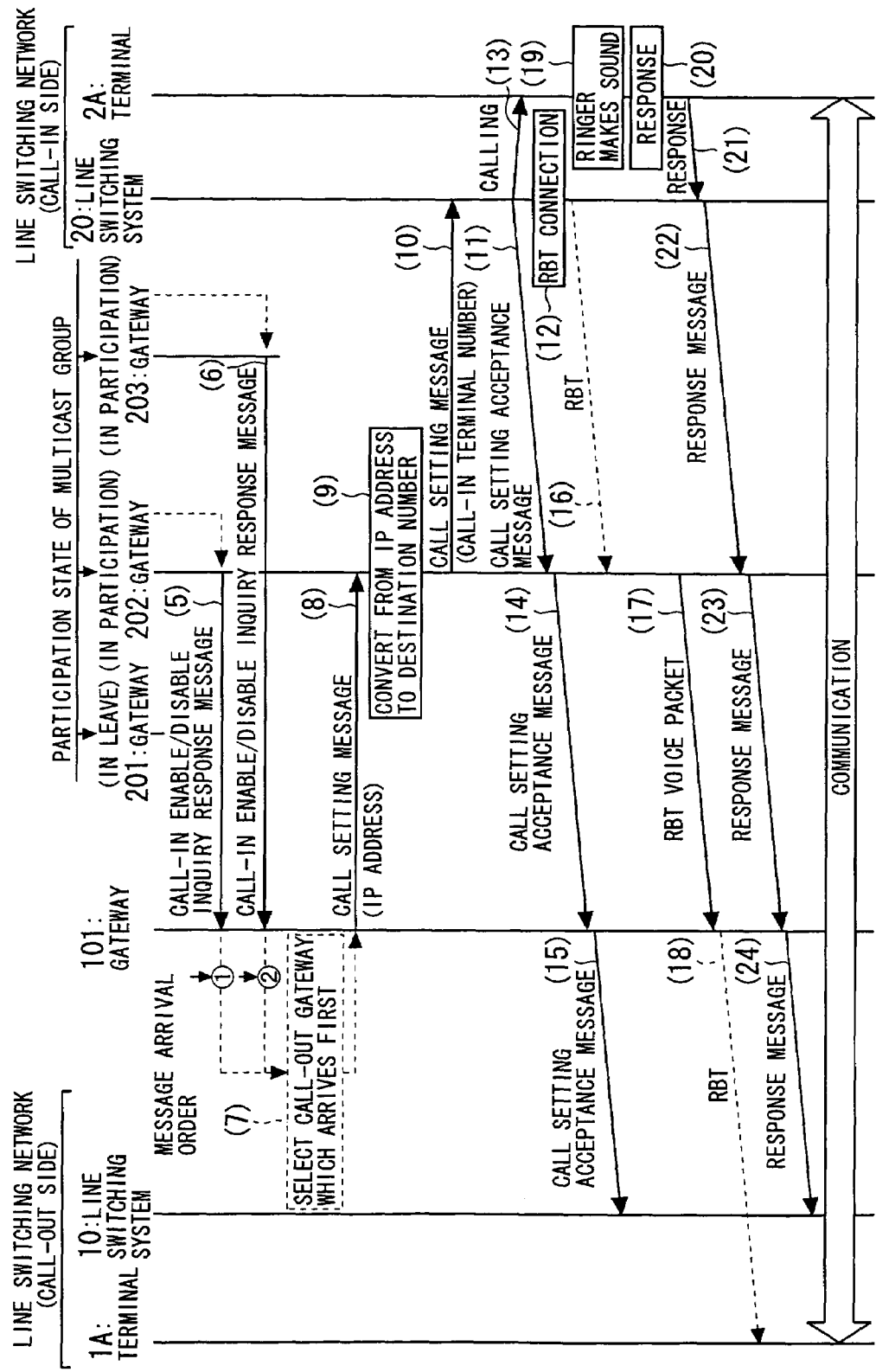
FIG. 7 is a diagram for explaining the first operation.

FIGS. 6 and 7 are sequence diagrams showing the first operation in a call setting state. In FIG. 6, in the IP packet network IN, each of the routers 110, 210, and 310 periodically multicasts the HMQ message to a group of gateway devices (group of gateway devices which can serve as gateway devices on a call-in side) corresponding to a group address to inquire participation in the multicast group.

When the gateway device which participates in the multicast group cannot transmit data or messages to the line switching system, the gateway device transmits the LEAVE message to the router directly connected to the gateway device to leave from the multicast group.

In FIG. 6, with the operation described above, of the gateway devices 201, 202, and 203 connected to the line switching system 20, the gateway devices 202 and 203 participate in the multicast group. In this state, it is assumed that the terminal device 1A serves as a call-out terminal, that the terminal device 2A serves as a call-in terminal, that a call is set between the terminal device 1A and the terminal device 2A to perform voice communication.

In this case, a user of the terminal device 1A dials a dial number "722–200" for the terminal device 2A as a destination number. This destination number is input to the line switching system 10(1).

When the line switching system 10 receives the destination number, the line switching system 10 recognizes that the transmission direction of the call setting message is a side of the IP packet network IN, by a known method. The line switching system 10 transmits a call setting message (destination number: 722–200) regulated by the ISDN (Integrated Service Digital Network) protocol to, e.g., the gateway device 101 (2).

Figure 8:
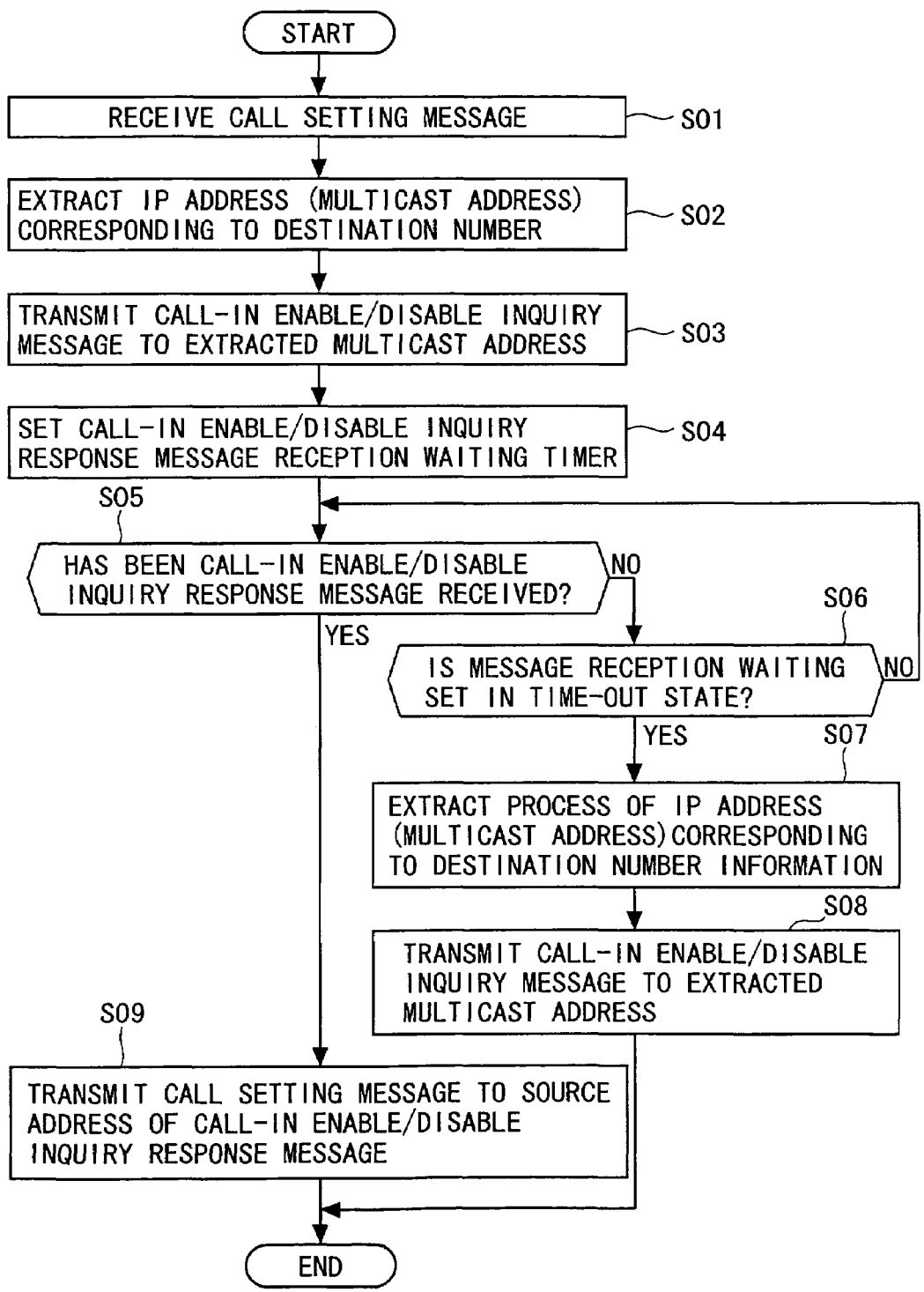
FIG. 8 is a flow chart showing processes performed by a gateway device on a call-out side in the first operation.

When the gateway device 101 receives the call setting message (destination number: 722–200), the central controlling unit 31 of the gateway device 101 executes the processes shown in the flow chart in FIG. 8 (3).

More specifically, as shown in FIG. 8, when the central controlling unit 31 receives the call setting message from the line switching system 10 (step S01), the central controlling unit 31 extracts the IP address (multicast address) corresponding to the destination number "722–200" included in the call setting message (step S02).

More specifically, the central controlling unit 31 refers to the conversion table 34 held in the main memory 32. Subsequently, the central controlling unit 31 extracts an IP address "XXX. XXX. XXX. 220" which corresponds to the dialing code "722" of the line switching system included in the destination number "722–200" and the gateway type of which is set to be a "main gateway".

The central controlling unit 31 edits the IP packet including a call-in enable/disable inquiry message tomulticast the IP packet to the IP packet network IN (step S03).

The call-in enable/disable inquiry message is a message for inquiring the gateway devices (in this embodiment, the gateway devices 201, 202, and 203) which can serve as a gateway device on a call-in side whether the call setting message can be transmitted to the line switching system 20. This message is called "QUERY" by the present inventor.

FIG. 9A is a table for explaining a format of the call-in enable/disable inquiry message. As shown in FIG. 9A, the call-in enable/disable inquiry message has a field in which an information size length and a field in which a gateway type (0: main gateway, 1: spare gateway) is stored.

The central controlling unit 31 edits the IP packet by adding a predetermined IP header to the call-in enable/disable inquiry message. An extracted multicast address "XXX. XXX. XXX. 220" is set in the IP header of the edited IP packet.

Thereafter, when the central controlling unit 31 transmits the IP packet including the call-in enable/disable inquiry message to the IP packet network IN, the central controlling unit 31 starts clocking performed by a timer for waiting for the reception of a response message (call-in enable/disable inquiry message: which is called "QUERY CONNECT" by the present inventor) of the call-in enable/disable inquiry message (step S04).

Returning to FIG. 6, the call-in enable/disable inquiry message transmitted from the gateway device 101 is received by the router 210. When the central controlling unit 41 of the router 210 recognizes that the destination IP address of the received IP packet is multicast designation, the central controlling unit 41 reads out at least one of IP address (IP address of the gateway device participated in the multicast group) stored in the address management area 43 and multicasts the call-in enable/disable inquiry message to at least one of gateway device in which the IP address is set as a destination.

In this manner, the call-in enable/disable inquiry messages is transmitted to each of the gateway devices 202 and 203 which have been participate in the multicast group. More specifically, the call-in enable/disable inquiry message is multicast from the gateway device 101 to the gateway devices 201, 202, and 203, and is received by only the gateway devices 202 and 203 (4).

Each of the gateway devices 202 and 203, when receives the call-in enable/disable inquiry message, operates the same processing as follows. For example, the central controlling unit 31 of the gateway device 202 determines whether the gateway device 202 can communicate the call setting message to the line switching system 20 or not. When the gateway device 202 can communicate the call setting message, transmits the call-in enable/disable inquiry response message to the gateway device 101. On the other hand, the gateway device cannot communicate the call setting message, ignores the call-in enable/disable inquiry message. In FIG. 6, each of the gateway devices 202 and 203 transmits IP packet including the call-in enable/disable inquiry response messages to the gateway device 101.

FIG. 9B is a table for explaining a format of a call-in enable/disable inquiry response message. As shown in FIG. 9B, the call-in enable/disable inquiry response message has a field in which a size length of information is stored and a field in which a gateway type (0: main gateway, 1: spare gateway) is stored.

When the central controlling unit 31 of the gateway device 101 receives the IP packet including the call-in enable/disable inquiry response message before the reception waiting timer is set in a time-out state (step S05; Y: see FIG. 8), and the central controlling unit 31 edits an IP packet including a call setting message which is set the source address of the IP packet including the call-in enable/disable inquiry response message as a destination. Thereafter, the central controlling unit 31 transmits the IP packet including the call setting message to a gateway device on the call-in side corresponding to the destination (step S09: see FIG. 8).

More specifically, the central controlling unit 31 selects a gateway device in which the call-in enable/disable inquiry response message arrives at the gateway device 101 for the first time (most quick response) as a gateway device on the call-in side (7), and transmits the call setting message to the gateway device (8). In the example in FIG. 7, the gateway device 202 is selected, and the IP packet including the call setting message is transmitted to the gateway device 202.

When the gateway device 202 receives the IP packet, the central controlling unit 31 of the gateway device 202 extracts the call setting message from the received IP packet, and transmits the call setting message to the line switching system 20 on the basis of a call-in terminal number "200" (number of the terminal device 2A) included in the call setting message.

When the line switching system 20 receives the call setting message, the line switching system 20 edits a call setting acceptance message corresponding to the call setting message. The edited call setting acceptance message is transmitted to the gateway device 202 (11). In the line switching system 20, a counter voice communication line is captured, so that an RBT (Ring Back Tone) is connected (12). On the other hand, the line switching system 20 calls the terminal 2a (13).

When the gateway device 202 receives a call setting acceptance message from the line switching system 20, the central controlling unit 31 of the gateway device 202 edits an IP packet by adding an IP header to the call setting acceptance message. Thereafter, the edited IP packet including the call setting acceptance message is transmitted to the gateway device 101 through the IP packet network IN (14).

When the gateway device 101 receives the IP packet, the central controlling unit 31 of the gateway device 101 extracts the call setting acceptance message from the received IP packet, and transmits the extracted call setting acceptance message to the line switching system 10 (15).

The RBT connected to the counter voice communication line is given to the gateway device 202 (16). At this time, the central controlling unit 31 of the gateway device 202 causes the CODEC 33 to code the RBT, edits the IP packet including the coded RBT, and transmits the edited IP packet to the gateway device 101 (17).

When the gateway device 101 receives the RBT voice packet through the IP packet network IN, the central controlling unit 31 of the gateway device 101 causes the CODEC 33 to decode the voice packet data in the received RBT voice packet into an RBT. The decoded RBT is transmitted to the line switching system 10 through the TDM interface of the gateway device 101 and given to the line circuit of the terminal device 1A through the network circuit of the line switching system 10 (18).

On the other hand, when the line switching system 20 calls the terminal device 2A (13), the ringer of the terminal device 2A makes sound (19). In contrast to this, when a user of the terminal device 2A performs a response operation (20), a response signal is input from the terminal device 2A to the line switching system 20 (21). In this case, the line switching system 20 detects a response of the terminal device 2A, edits a response message, and transmits the response message to the gateway device 202 (22).

When the central controlling unit 31 of the gateway device 202 receives the response message, the central controlling unit 31 edits the IP packet including the response message and transmits the IP packet to the IP packet network IN (23). This IP packet is received by the gateway device 101 through the IP packet network IN. The central controlling unit 31 of the gateway device 101 extracts a response message from the received IP packet and gives the response message to the line switching system 10 (24).

With the call setting procedure (signaling) described above, a call is set between the terminal device 1A and the terminal device 2A, and a busy state is set between the terminal device 1A and the terminal device 2A. Thereafter, voice can be exchanged between the terminal device 1A and the terminal device 2A.

(Second Operation)

In the first operation described above, a case in which each of the gateway devices 202 and 203 returns the call-in enable/disable inquiry response message when the call-in enable/disable inquiry message is transmitted from the gateway device 101 has been described. In the second operation, a case in which the call-in enable/disable inquiry response message is not returned when the call-in enable/disable inquiry message is received by the gateway device 101 will be described below with reference to the first operation. FIG.

Figure 10:
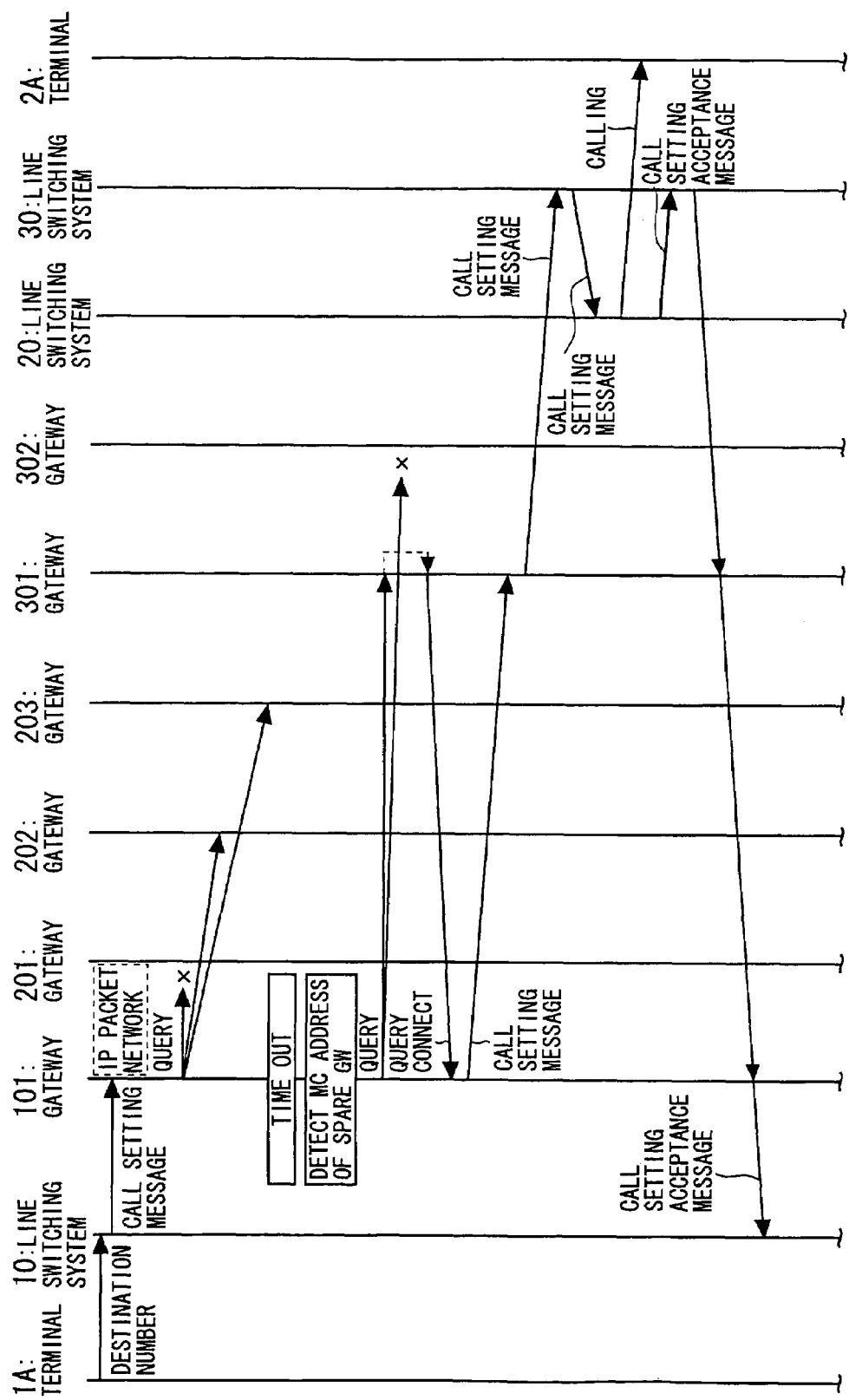
FIG. 10 is a diagram for explaining a second operation.

10 is a sequence diagram showing the second operation. As shown in FIG. 10, the central controlling unit 31 of the gateway device 101 multicasts the call-in enable/disable inquiry messages to the gateway devices 201, 202, and 203.

Thereafter, when the central controlling unit 31 does not receive the call-in enable/disable inquiry response message from each of the gateway devices 201, 202, and 203 before the reception waiting timer is set in a time-out state (step S06 in FIG. 8; N), the central controlling unit 31 extracts the IP address (multicast address) corresponding to a destination number from the conversion table 34 (S07 in FIG. 8). More specifically, the central controlling unit 31 extracts an IP address "XXX. XXX. XXX. 330" which corresponds to a call-in terminal number included in the destination number and the gateway type of which is set to be a "spare gateway".

Subsequently, the central controlling unit 31 edits the IP packet including the call-in enable/disable inquiry message having the extracted IP address as a destination and multicasts the edited IP packet to the IP packet network IN (step S08 in FIG. 8). In this manner, the IP packet including a call-in enable/disable inquiry message is multicast to a group of spare gateway devices (gateway devices 301 and 302) corresponding to a group of main gateway devices (gateway device 201, 202, and 203). The IP packet is received by the router 310 through the IP packet network IN.

When the central controlling unit 41 of the router 310 receives the IP packet, the central controlling unit 41 reads out all the IP addresses stored in an address management table 43. The central controlling unit 41 respectively transmits the IP packet including the call-in enable/disable inquiry message to a destination corresponding to the read out the IP address. In this manner, the IP packet is multicast to all the gateway devices which participates in the multicast group in the group of spare gateway devices. In this case, for example, only the gateway device 301 participates in the multicast group, as shown in FIG. 10, the IP packet is transmitted to only the gateway device 301.

Thereafter, when the gateway device 301 transmits the IP packet including a call-in enable/disable inquiry response message corresponding to the call-in enable/disable inquiry message, the IP packet is received by the gateway device 101 through the IP packet network IN.

In this case, the gateway device 101, as described in the first operation, transmits an IP packet including a call setting message to the gateway device 301. When the gateway device 301 receives the IP packet, the gateway device 301 transmits the call setting message to the line switching system 30.

When the line switching system 30 receives the call setting message, the line switching system 30 transmits the call setting message to the line switching system 20 through a relay line C. In this manner, a transmission route of messages and data passing through the terminal device 1A—the line switching system 10—the gateway device 101—the gateway device 301—the line switching system 30—the line switching system 20—the terminal device 2A is established.

When the line switching system 20 receives the call setting message from the line switching system 30, as in the first operation, the line switching system 20 transmits a call setting acceptance message to the line switching system 30 and calls the terminal device 2A. Thereafter, an RBT (RBT voice packet), the call setting acceptance message, and a response (response message) are transmitted through the route described above (see FIG. 7), a call is set and established between the terminal device 1A and the terminal device 2A, and voice communication is performed.

When the gateway device 101 does not receive the call-in enable/disable inquiry response message from any one of the gateway devices 301 and 302, the gateway device 101 determines that a call cannot be set, and the process of ending the call setting process (signaling) is executed.

Operation of First Embodiment

According to the first embodiment, before the gateway device on the call-out side transmits a call setting message to the gateway device on the call-in side, the gateway device on the call-out side transmits a call-in enable/disable inquiry message to a group of gateway devices which can serve as gateway devices on the call-in side, and transmits a call setting message by using the gateway device at which a call-in enable/disable inquiry response message arrives first as the gateway device on the call-in side.

In this manner, the gateway device on the call-out side can transmits the call setting message to a gateway device which can reliably transmit a call setting message. More specifically, the call setting message can be transmitted through a proper route. For this reason, the gateway device on the call-out side need not retransmit the call setting message. Therefore, an increase in a load acting on the IP packet network caused by repeatedly retransmitting the call setting message and delay of data and messages can be prevented.

Since a call setting message is transmitted to the gateway device on the call-out side at which the call-in enable/disable inquiry response message arrives first, the call setting message can be transmitted through a route in which a message can be transmitted within a shortest time.

In this embodiment, the gateway device at which the call-in enable/disable inquiry response message arrives first is determined as a gateway device to which the call setting message must be transmitted. In contrast to this, the central controlling unit 31 of the gateway device on the call-out side may determine the gateway device to which the call setting message must be transmitted from the gateway devices which receive the call-in enable/disable inquiry response messages by another method.

More specifically, the gateway device on the call-out side can determine selection of a gateway by using an order in which the call-in enable/disable inquiry response messages arrive as a trigger. For this reason, the order can be determined depending on the presence/absence of emergency of a generated call or an amount of data.

In this embodiment, the gateway devices 301 and 302 are set as spare gateways, and call-in enable/disable inquiry messages are multicast to the gateway devices 301 and 302. In place of this, when only the gateway device 301 is set as a spare gateway (second gateway of the present invention), and when the gateway device on the call-out side does not receive the call-in enable/disable inquiry response message before the timer is set in a time-out state, the call setting message may be transmitted to the gateway device 301.

Second Embodiment

The second embodiment of the present invention will be described below. Since the second embodiment and the first embodiment have common points, only different points between the first embodiment and the second embodiment will be described below. In the second embodiment, settings for the gateway devices 101, 102, 201, 202, 203, 301, and 302 shown in FIG. 1 are different from each other.

For example, the gateway device 101 will be exemplified. When the main memory 32 (see FIG. 2) of the gateway device 101 receives a call setting message from the line switching system 10, the main memory 32 holds an IP address corresponding to a destination number included in the call setting message. This IP address is an IP address (e.g., the IP address of the gateway device 201) of the gateway device to which the call setting message is transmitted first.

Figure 11:
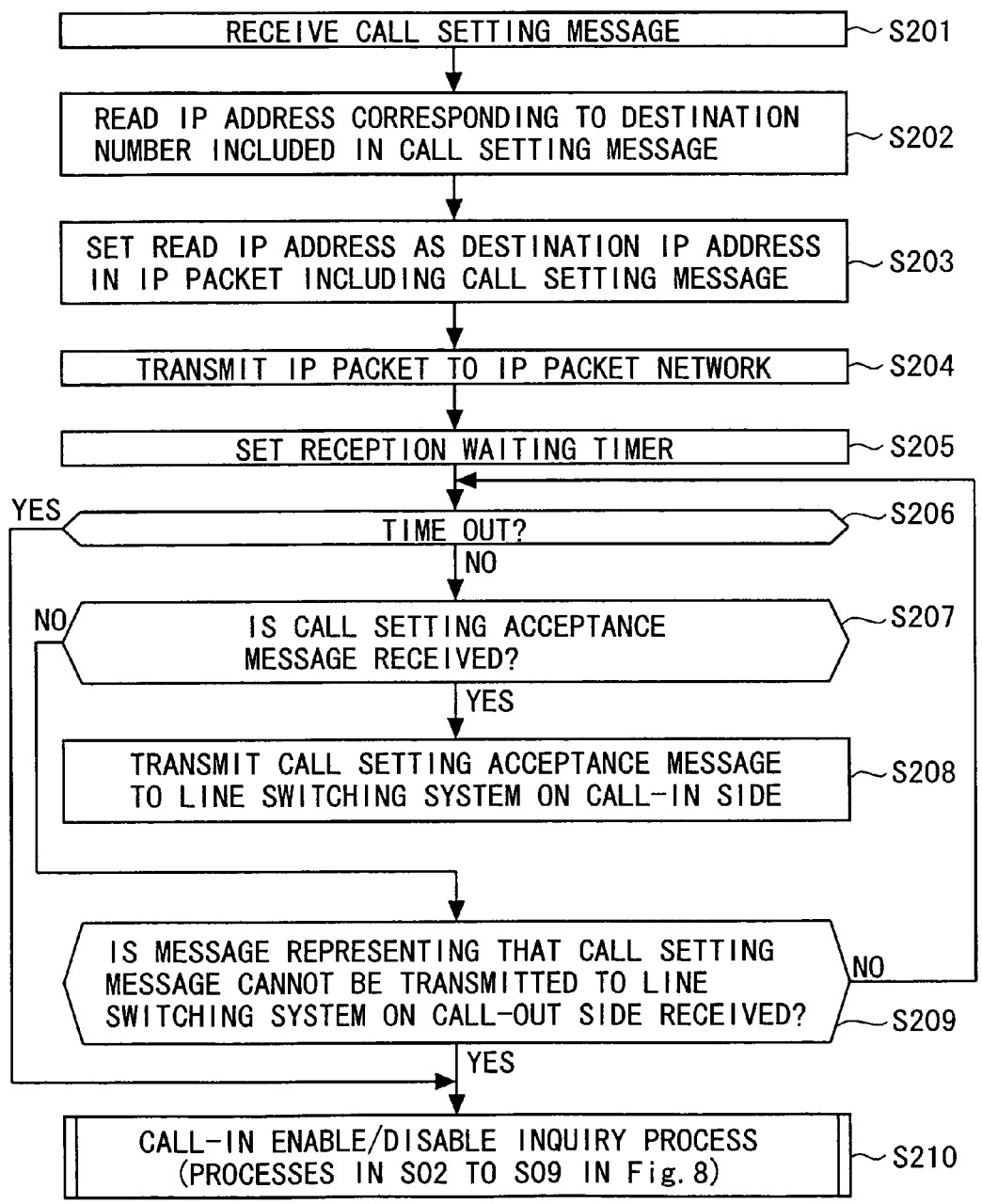
FIG. 11 is a flow chart showing processes performed by a gateway device on a call-out side in the second embodiment.

As in the first embodiment, when a call setting process (signaling) is executed between the terminal device 1A and the terminal device 2A, and when the gateway device 101 receives the call setting message, the central controlling unit 31 of the gateway device 101 executes the processes shown in the flow chart in FIG. 11. More specifically, when the central controlling unit 31 receives the call setting message (step S201), the IP address (the IP address of the gateway device 201) corresponding to the destination number included in the received call setting message is read out from the main memory 32 (step S202).

Next, the central controlling unit 31 sets the read our IP address as a destination address for the IP packet including the call setting message (step S203). Thereafter, the IP packet is transmitted to the IP packet network IN (step S204).

Thereafter, the central controlling unit 31 waits until a call setting acceptance message is transmitted from the gateway device 201 (steps S205, S206, and S207). When the central controlling unit 31 receives the IP packet including the call setting acceptance message from the gateway device 201 (step S207; Y), the call setting acceptance message is transmitted to the line switching system 10 to perform the call setting process (step S208).

In contrast to this, when the central controlling unit 31 receives, in place of the call setting acceptance message, a message representing the call setting message cannot be transmitted to the line switching system 20 from the gateway device 201 (step S209; Y), the central controlling unit 31 executes, as the subsequent processes, the processes in steps S02 to S09 shown in FIG. 8 described in the first embodiment (step S210).

As described in the second embodiment, the gateway device on the call-out side transmits the call setting message to the predetermined gateway device on the call-out side. When the gateway device cannot transmit the call setting message to a line switching system, a call-in enable/disable inquiry message may be multicast.

Third Embodiment

The third embodiment of the present invention will be described below. Since the third embodiment and the second embodiment have common points, different points between the second embodiment and the third embodiment will be described below. In the third embodiment, setting for the gateway devices 101, 102, 201, 202, 203, 301, and 302 shown in FIG. 1 are different from each other.

Figure 12:
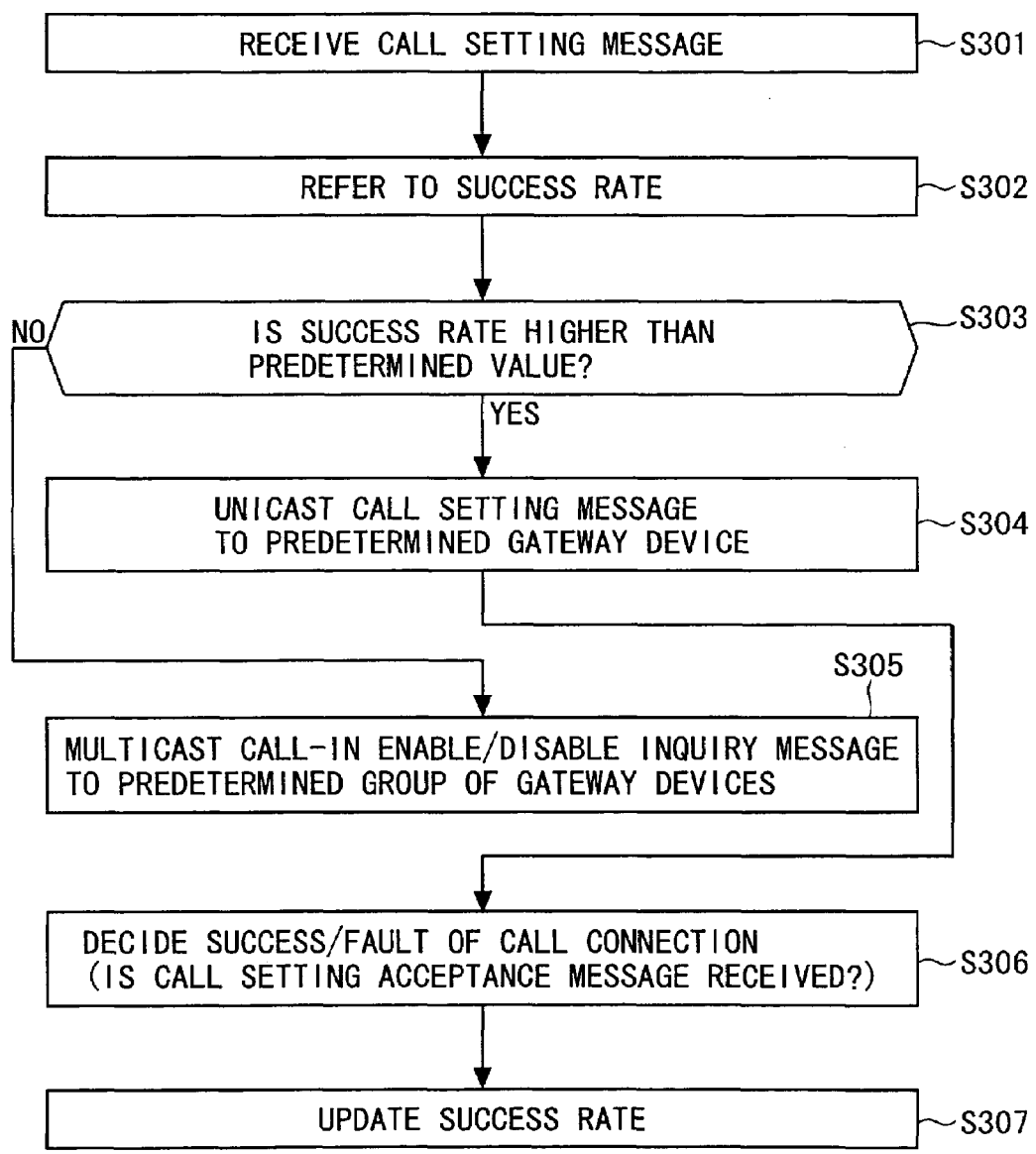
FIG. 12 is a flow chart showing processes performed by a gateway device on a call-out side in the third embodiment.
Figure 13:
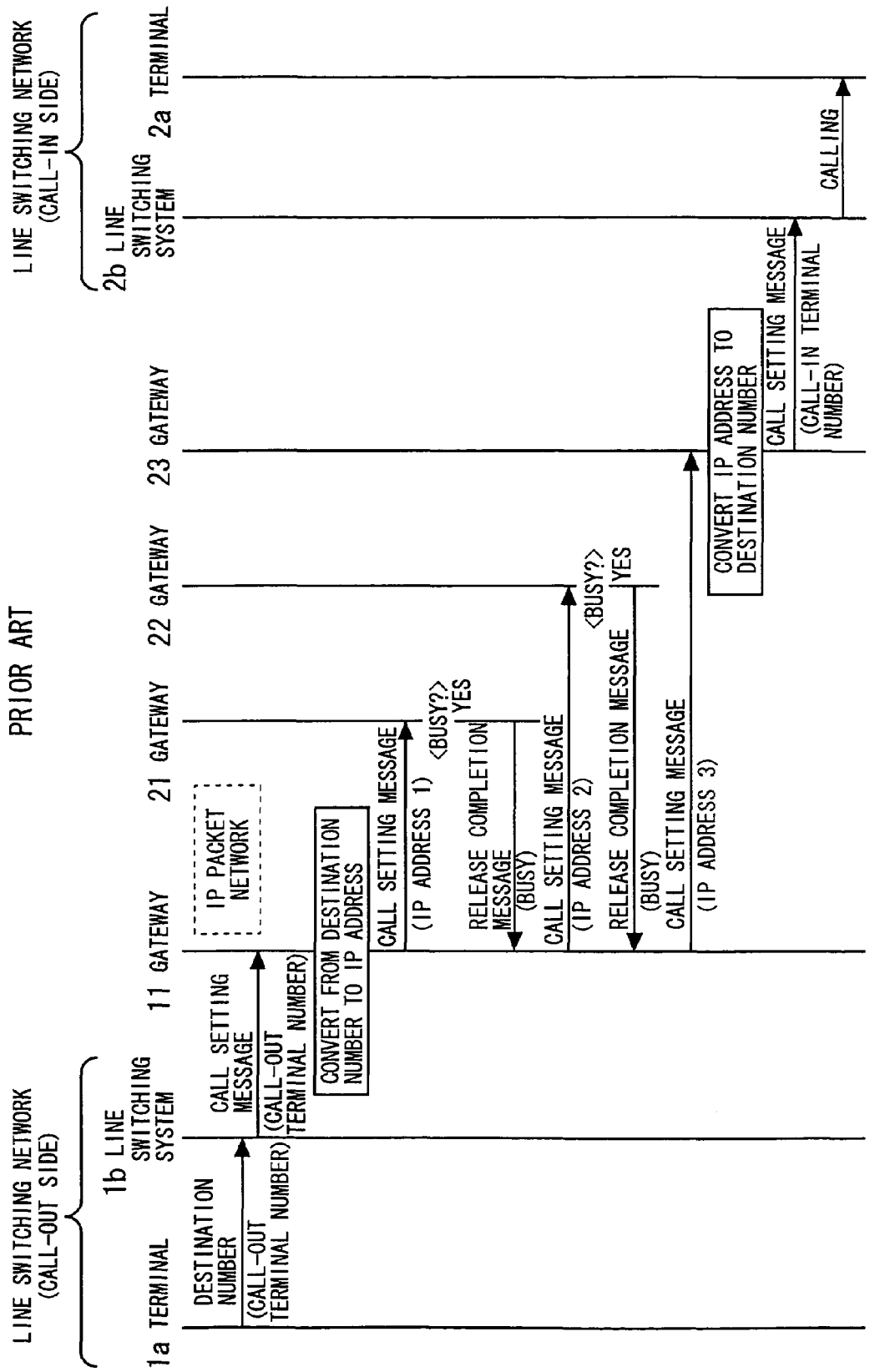
FIG. 13 is a diagram for explaining a prior art.

More specifically, in the third embodiment, as in the second embodiment, a gateway device on a call-out side transmits a call setting message to a predetermined gateway device. However, the gateway device on the call-out side transmits the call setting message to the predetermined gateway device only when a success rate of a call connection to the predetermined gateway device is higher than a predetermined value. More specifically, when the central controlling unit 31 of the gateway device on the call-out side receives a call setting message from the line switching system, the central controlling unit 31 executes the processes shown in the flow chart in FIG. 12.

When the central controlling unit 31 of the gateway device on the call-out side receives a call setting message (step S301) the central controlling unit 31 refers to a success rate held in the main memory 32 (step S302). This success rate represents a success rate of a call connection when a call setting message is transmitted to an IP address corresponding to a destination number in a time frame extending from the present time to certain past time.

For example, it is assumed that the gateway device on the call-out side is the gateway device 101 and that the IP address of the gateway device 201 is set as an IP address corresponding to a destination number. In this case, a case in which the call setting message received from the gateway device 101 to the gateway device 201 can be transmitted to the line switching system 20 is defined as "success", and a case in which the call setting message cannot be transmitted is defined as "fault". The success rate is stored in the main memory 32 of the gateway device 101.

When the success rate stored in the main memory 32 is higher than a predetermined value (step S303; Y), the central controlling unit 31 unicasts a call setting message to a gateway device (gateway device 202) having an IP address corresponding to a destination number (step S304) In contrast to this, when the success rate is not higher than the predetermined value, the central controlling unit 31 multicasts call-in enable/disable inquiry messages to a group of gateway devices each having a multicast address corresponding to the destination number (step S305).

When the call setting message is unicast, the central controlling unit 31 decides the success/fault of a call connection between the gateway device 202 and the line switching system 20 by checking whether the central controlling unit 31 receives a call setting acceptance message corresponding to the call setting message within a predetermined time or not (step S306) Thereafter, the gateway device 301 updates the value of the success rate stored in the main memory 32 depending on the decision result of the success/fault (step S307).

What is claimed is:

1. A call setting method for a network system, the network system including a first line switching network as a line switching network on a call-out side, a first gateway connected with the first line switching network, an internet protocol (IP) packet network connected with the first gateway, second gateways respectively connected with the IP packet network, and a second line switching network as a line switching network on a call-in side connected with each of the second gateways, said method comprising:
the first gateway, when a call is set between the first line switching network and the second line switching network through the IP packet network, receiving a call setting message from the first line switching network;
the first gateway transmitting a call-in enable/disable inquiry message to the IP packet network to select one of the second gateways which can communicate the call setting message from the first gateway to the second line switching network, the call-in enable/disable inquiry message is received by each of the second gateways through the IP packet network;
each of the second gateways when receiving the call-in enable/disable inquiry message, judging whether the second gateway itself can communicate the call setting message to the second line switching network so that each of the second gateways transmits a call-in enable/disable inquiry response message to the first gateway only when it is judged that the second gateway itself can communicate the call setting message to the second line switching network, the call-in enable/disable inquiry response message is received by the first gateway through the IP packet network; and the first gateway selecting one of the second gateways that corresponds to a source of the received call-in enable/disable inquiry response message, to transmit the call setting message to the selected second gateway.

2. A call setting method for a network system according to claim 1, wherein the first gateway selects one of the second gateways corresponding to a source of the call-in enable/disable inquiry response message arriving at the first gateway first.

3. A call setting method for a network system according to claim 1, wherein the first gateway multicasts the call-in enable/disable inquiry message toward the second gateways;

each of the second gateways participates or leaves with respect to a multicast group for receiving the multicast call-in enable/disable inquiry message, dynamically; and the multicast call-in enable/disable inquiry message is given only to each of the second gateways which is participating in the multicast group.

4. A call setting method for a network system according to claim 3, wherein each of the second gateways leaves from the multicast group if the second gateway itself cannot communicate the call setting message from the first gateway to the second line switching network.

5. A call setting method for a network system according to claim 3, wherein each of the second gateways participates in the multicast group if the second gateway itself can communicate the call setting message from the first gateway to the second line switching network.

6. A call setting method for a network system according to claim 1, further comprising:

the first gateway, when the first gateway cannot receive the call-in enable/disable inquiry response message from all the second gateways, transmitting the call setting message to a third gateway, the third gateway linking the IP packet network and a third line switching network, the third line switching network is connected to the second line switching network;

the third gateway, when receiving the call setting message from the first gateway, transmitting the call setting message to the third line switching network; and the third line switching network, when receiving the call setting message from the third gateway, transmitting the call setting message to the second line switching network.

7. A call setting method for a network system according to claim 1, further comprising:

the first gateway, when the first gateway cannot receive the call-in enable/disable inquiry response message from all the second gateways, transmitting the call-in enable/disable inquiry message to said IP packet network, the call-in enable/disable inquiry message is received by at least one third gateway, each of which is connected to the IP packet network, through said IP packet network, each third gateway linking the IP packet network and a third line switching network, the third line switching network is connected to the second line switching network;

each of the third gateways when receiving the call-in enable/disable inquiry message, if the third gateway itself can communicate the call setting message from the first gateway to the third line switching network, transmitting a call-in enable/disable inquiry response message to the first gateway;

the first gateway selecting one of the third gateways transmitting the call-in enable/disable inquiry response message, and transmitting the call setting message to the selected third gateway;

the selected third gateway, when receiving the call setting message from the first gateway, transmitting the call setting message to the third line switching network; and the third line switching network, when receiving the call setting message from the third gateway, transmitting the call setting message to the second line switching network.

8. A call setting method for a network system according to claim 7, wherein the first gateway multicasts the call-in enable/disable inquiry message toward the third gateways;

each of the third gateways participates or leaves with respect to a multicast group for receiving the multicast call-in enable/disable inquiry message, dynamically; and the multicast call-in enable/disable inquiry message is given only to each of the third gateways which is participating in the multicast group.

9. A call setting method for a network system according to claim 1, wherein the first gateway unicasts the call setting message to a specific gateway, which is one of the second gateways, through said IP packet network; and thereafter, when the specific gateway cannot communicate the call setting message to the second line switching network, the first gateway multicasts the call-in enable/disable inquiry message to the IP packet network.

10. A call setting method for a network system according to claim 1, wherein when the first gateway receives the call setting message from the first line switching network, the first gateway selects either unicasting the call setting message to a specific gateway, which is one of the second gateway, or multicasting the call-in enable/disable inquiry message to the IP packet network.

11. A gateway connected to a first line switching network as a line switching network on a call-out side, and connected to other gateways through an internet protocol (IP) packet network, each of the other gateways is connected to a second line switching network as a line switching network on a call-in side, said gateway comprising:

a receiving unit, when a call is set between the first line switching network and the second line switching network, receiving a call setting message from the first line switching network;

an editing unit editing, when the call setting message is received by said receiving unit, a call-in enable/disable inquiry message;

a transmitting unit transmitting the call-in enable/disable inquiry message to the IP packet network, the call-in enable/disable inquiry message is received by each of the other gateways through the IP packet network;

a unit to receive a call-in enable/disable inquiry response message, the call-in enable/disable inquiry response message is transmitted from each of the other gateways, which can communicate the call setting message from said gateway to the second line switching network when receiving the call-in enable/disable inquiry message;

a unit selecting one of the other gateways corresponding to a source of the call-in enable/disable inquiry response message arriving at said gateway first; and a unit transmitting the call setting message to said one of the other gateways which is selected.

12. A gateway according to claim 11 further comprising:

a table for storing a multicast address; and a reading unit reading out a multicast address corresponding to a call setting message, which is received from the first line switching network, from said table, wherein said editing unit edits an IP packet with the call-in enable/disable inquiry message, which is set, as a destination address, the read out multicast address, and said transmitting unit transmitting the edited IP packet to the IP packet network so that the call-in enable/disable inquiry message is received at least one of the other gateways.

* * * * *